United States Patent Office 3,050,801
Patented Aug. 28, 1962

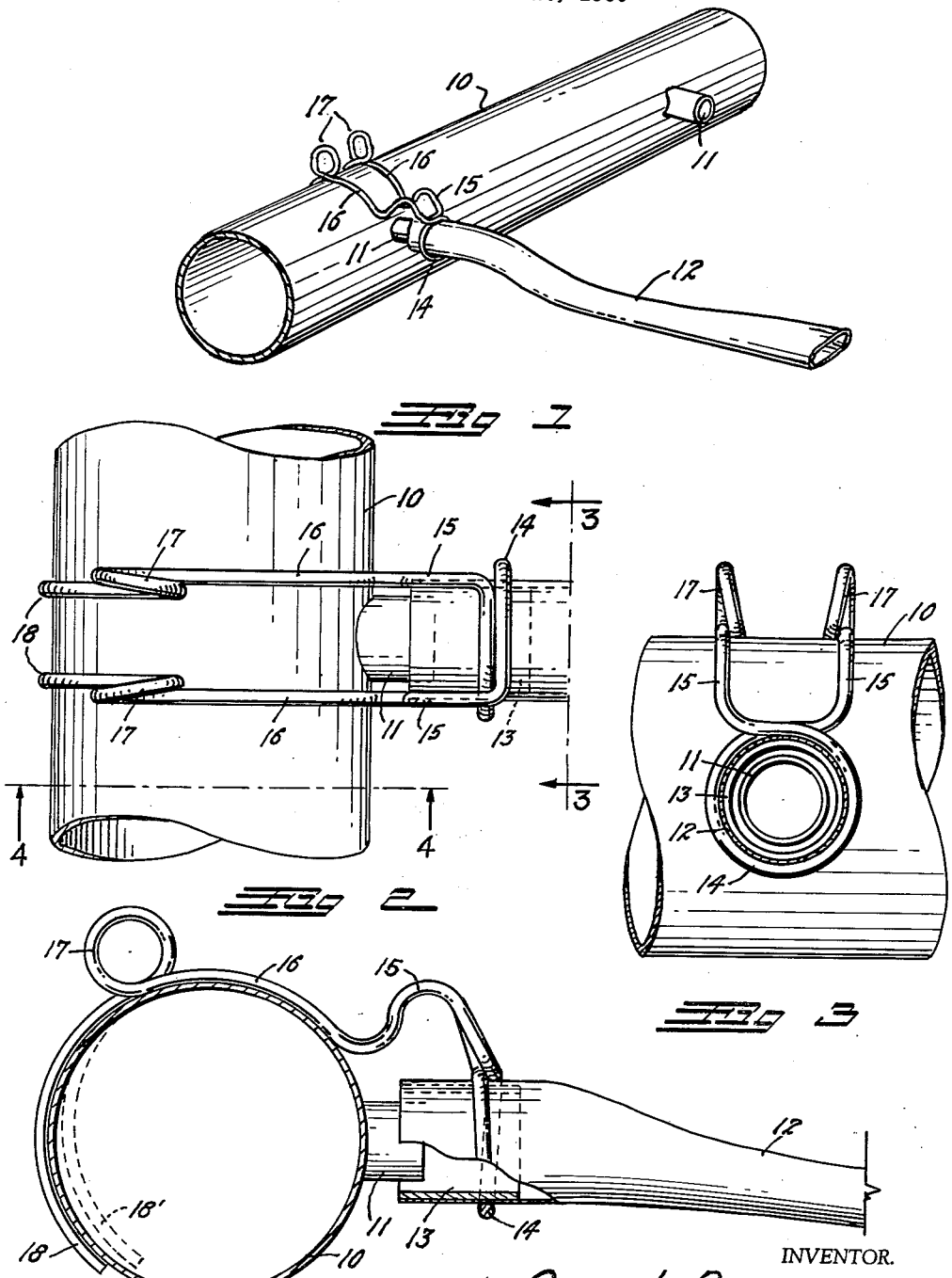

3,050,801
UNIVERSAL SOCK CLAMP
Gilles L. Downey, 703 W. 15th St., Grand Island, Nebr.
Filed Oct. 26, 1960, Ser. No. 65,075
1 Claim. (Cl. 24—81)

This invention relates to an irrigation sock clamp. It is customary in above-ground irrigation systems to employ relatively large aluminum pipes laid on the ground at the heads of and at right angles to the crop rows. The pipes are provided with spaced-apart outlets along the side or sides thereof and the outlets are provided with outlet nipples or adjustable gates of a variety of different types. Since it is impractical to have the outlets accurately spaced to match the rows of various types of crops, flexible tubes or hoses known as "socks" are usually attached to the outlet nipples to direct the water into the desired rows so as to prevent washing and erosion. Various types of sock holders have been designed for holding the socks on various types of gates but, due to the wide variety of types of gates, the holders are not interchangeable and a wide variety of holders must be provided. Attempts have been made to hold the socks in place by means of chains or straps going completely around the pipe. These have not been satisfactory for, since the pipe is lying on the ground, it is difficult to place an attachment means around the pipe. Stakes have been driven into the ground to hold the socks in place but this is an unsatisfactory and time-consuming operation.

The principal object of this invention is to provide a universal sock clamp for use on gated irrigation pipe for row crop irrigation which will accurately position the sock to receive the water from any type of a gate outlet in the pipe without attachment to or contact with the gates, valves, or outlet nipples so that it will provide universal application to all above-ground irrigation systems.

Another object is to provide a universal sock clamp which will position the sock in spaced relation to the outlet so as to receive a discharging stream or jet of water regardless of the type of outlet.

A further object is to provide a universal sock clamp which can be quickly lifted from and positioned on the irrigation pipe without requiring tools of any kind.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a fragmentary perspective view illustrating a section of a conventional gated irrigation pipe with the invention in place thereon;

FIG. 2 is an enlarged top view of the universal sock clamp illustrating it in place on the irrigation pipe;

FIG. 3 is a cross sectional view taken on the line 3—3, FIG. 2; and

FIG. 4 is a similar cross section taken on the line 4—4, FIG. 2.

In the drawing a section of conventional gated irrigation pipe is illustrated at 10 provided with side outlet gates or nipples 11. A typical, flexible irrigation sock is indicated at 12. This invention is designed to position the receiving extremity of the socket 12 in the path of the stream of water discharged from a gate 11.

The invention comprises two elements; a relatively short sock tube 13 of a size to fit snugly within the intake extremity of the sock 12, and a clamp element arranged to clamp the sock 12 about the sock tube 13 and to simultaneously clamp itself about the pipe 10.

The clamping element comprises a single length of resilient rod preferably aluminum alloy rod bent at its middle to form a complete small ring 14 having a normal internal diameter slightly less than the external diameter of the sock tube 13. The two end portions of the rod extend tangentially from the ring 14 thence correspondingly upward and forward in parallel relation to form bracket portions 15 thence forwardly on an arc to form arcuate top portions 16. The two top portions 16 of the rod terminate in upward and rearward rolls to form two spring loops 17 from which the rod extremities extend arcuately forward and downward to form pipe clamping extremities 18.

The normal position of the pipe clamping extremity when not in engagement with the pipe 10 is indicated in broken line at 18' in FIG. 4. When in position on the pipe 10, the clamping portions 18 are flexed outwardly and extend slightly more than half way about the circumference of the pipe so as to exert a clamping action on the pipe.

The sock 12 is attached to the clamp element by first positioning one of the sock tubes 13 within the intake extremity of the sock, thence, by grasping the bracket portions 15 and compressing them together, the ring 14 is expanded sufficiently to slip the tube 13 with its surrounding sock within the ring 14. The bracket portions 15 are then released to allow the ring 14 to contract so as to rigidly grip the sock about the sock tube. The clamping extremities 18 are then engaged against the back side of the pipe 10 and the spring loops 17 are pushed diametrically downward to snap the clamp element over the pipe, as shown in the drawing.

It will be noted that the bracket portions 15 extend outwardly on an S-shaped curve to position the ring 14 in relatively wide spaced relation forwardly of the outlet nipple 11. The internal diameter of the sock tube 13 is greater than the external diameter of the outlet nipple 11 so that it will not contact the nipple at any point. In fact, it need only be in the path of the water jet or stream discharging from the nipple.

The operator can set his gate flow in advance by observation of the stream discharging from the gate or nipple. He can then snap the clamp element in place on the pipe at a point to maintain the sock in proper position without disturbance of the gate or its setting. The device can be removed by simply hooking the fingers into the spring loops 17 and pulling upwardly.

While a specific form of the improvement has been described and illustrated herein, it is to be understood that the same may be varied within the scope of the appended claim, without departing from the spirit of the invention.

Having thus described the invention what is claimed and desired to be secured by Letters Patent is:

A sock supporting device for supporting a tubular flexible irrigation sock in alignment with an outlet gate on an irrigation pipe comprising: a relatively short sock tube fitted snugly within the intake extremity of said sock; and a clamping element adapted to resiliently engage said irrigation pipe and simultaneously and resiliently surround and clamp said sock to said sock tube, said clamping element comprising a single length of resilient rod, a ring formed by said rod at the medial portion thereof surrounding and clamping said sock to said sock tube, the end portions of said rod extending oppositely and tangentially outward from said ring in overlapping relation, thence extending first upwardly from said ring and thence downwardly to form inverted U-shaped finger brackets which when pressed together expand said ring to release said sock, said end portions extending arcuately from said brackets to form semi-circular portions extending circumferentially about said irrigation pipe in parallel spaced planes at right angles to the axis of said pipe, said ring having a normal diameter less than the diameter of said sock tube and said semi-circular portions having a normal diameter less than the diameter of said pipe so that said tube and said pipe will be frictionally gripped as a result of the contractive bias of said ring and said semi-circular portions.

References Cited in the file of this patent

UNITED STATES PATENTS

| | | |
|---|---|---|
| 602,617 | Dale | Apr. 19, 1898 |
| 911,583 | Focht | Feb. 9, 1909 |
| 1,065,758 | Woodwell | June 24, 1913 |
| 1,310,627 | McEvilly | July 22, 1919 |
| 2,378,660 | Roux | June 19, 1945 |
| 2,636,704 | Norberg | Apr. 28, 1953 |
| 2,940,777 | Lundberg | June 14, 1960 |
| 2,957,217 | Mortorelli | Oct. 25, 1960 |

FOREIGN PATENTS

| | | |
|---|---|---|
| 392,769 | France | Oct. 6, 1908 |
| 1,129,738 | France | Sept. 10, 1956 |